United States Patent [19]

Penner et al.

[11] 4,366,664
[45] Jan. 4, 1983

[54] SWATHER

[75] Inventors: Bernard Penner; Arthur Kempan, both of Winnipeg, Canada

[73] Assignee: Versatile Cornat Corporation, Vancouver, Canada

[21] Appl. No.: 182,403

[22] Filed: Aug. 26, 1980

[30] Foreign Application Priority Data

Aug. 27, 1979 [CA] Canada .................................. 334474

[51] Int. Cl.³ ............................................. A01D 55/28
[52] U.S. Cl. ..................................... 56/15.2; 56/15.4; 56/15.5; 180/6.48
[58] Field of Search ...................... 56/10.2, 15.2, 15.3, 56/15.4, 15.5; 280/446 R; 180/6.48, 6.64

[56] References Cited

U.S. PATENT DOCUMENTS

| | | |
|---|---|---|
| 3,457,709 | 7/1969 | Killbery et al. ...................... 56/15.2 |
| 3,789,940 | 2/1974 | Burton ................................ 180/6.48 |
| 4,065,914 | 1/1978 | Phillips et al. ........................ 56/15.4 |
| 4,078,365 | 3/1978 | Ingalls .................................. 56/10.2 |
| 4,175,628 | 11/1979 | Cornell et al. ...................... 180/6.48 |

Primary Examiner—Robert A. Hafer
Attorney, Agent, or Firm—Wenderoth, Lind & Ponack

[57] ABSTRACT

A drive system for a pull-type swather or windrower in which a sensing device senses the side-draft of the swather under operating conditions. The sensing device indicates to a compensating device which is operable from the sensing device whether to increase, decrease or leave unchanged the rotational speed of drive wheels which are provided on the swather and powered by a power plant. The drive wheels act to keep the swather in an effective cutting position substantially transverse to the longitudinal axis of the tractor.

11 Claims, 10 Drawing Figures

SWATHER

This invention relates to farm implements and, in particular, to a pull-type swather which is operated behind a towing vehicle, such as a tractor.

In pull-type swathers, the transverse length of the swather is desirably considerable in order to cut a maximum amount of crop, such as wheat. This length, however, is limited because the "skew-angle" or side-draft of the swather has a tendency to increase as the length increases, other operating conditions remaining the same. When the soil is loose or the swather is operated uphill, the condition is exacerbated. When the side-draft increases, the effectiveness of the swather is reduced because the crop is no longer being transversely cut but rather is being cut on an angle. The angled cutter bar exposes a less effective cutting area to the crop and the width of the swather cut itself is reduced. In addition, the drag caused by the swather increases which means more pulling power is required from the tractor. Thus, there is reached a condition where the width of a swather is limited.

To overcome these problems, a drive wheel has been placed in the vicinity of the swather frame farthest removed from the axis of the towing vehicle. Such wheels may be operated from the towing vehicle by the operator or by a sensing device located on the swather frame which, in some way, senses the presence of an unacceptable side-draft.

These systems, however, also have inherent problems. Obviously, if operation of the drive wheel by the swather operator can be avoided, it is desirable to do so from his viewpoint to eliminate unnecessary operator functions and to allow more concentrated attention to the other tasks at hand. Similarly, known systems which sense the swather side-draft power the drive wheels from the power-take-off shaft of the towing vehicle and these wheels are not, therefore, adjusted to the ground speed of the tractor but rather to the tractor engine speed. This reduces the operation flexibility of the tractor or pulling vehicle.

According to the present invention, there is disclosed a position compensating system to alter the side-draft of a pull-type implement, said system comprising:
 (a) a drive wheel mounted on the frame of said implement and adapted to drive said implement;
 (b) drive means to drive said drive wheel;
 (c) at least two hitch members mounted between a source of pull power for the implement and said implement, one of said hitch members being adapted to move relative to the other of said hitch members;
 (d) a sensing mechanism mounted between said hitch members and adapted to sense said relative movement of said hitch members; and
 (e) a compensating system operable from said sensing mechanism and adapted to automatically vary the output of said drive means.

A further problem in pull-type swathers and other farm implements is transportation between operating areas. Because there are limitations on the width of a swather while being transported due to roads, gates, tunnels, bridges and the like, the swather is usually transported in a longitudinal position behind the pulling vehicle. In known swathers, a separate hitch or two bar is provided which extends from one end of the swather parallel to its longitudinal axis. Since the weight of the swather is distributed between the wheels mounted on the rearwardly portion of the swather and the hitch connected to the tractor, it is necessary to utilize a jack which is positioned beneath the swather hitch so as to transfer the swather weight to the jack. The tractor then is driven from the hitch and reconnected to the tow bar on the end of the swather by backing into position. It is also necessary to mount a removable third wheel on the swather frame forwardly of the swather so that the frame, when being transported by the two bar, is supported on both sides of its longitudinal axis. Such a procedure is cumbersome, time consuming and unsafe. According to a further aspect of the invention, there is disclosed a hitch linkage for an implement operable between operating and transport conditions, said hitch linkage comprising:
 (a) a main member articulately connected to the frame of said implement in the vicinity of one end thereof and being adapted to be connected to the hitch of a pulling vehicle;
 (b) a secondary member articulately connected to said frame of said implement in the vicinity of said one end at a second position thereof;
 (c) a third member rotatably connected to said main member and to said secondary member at the end removed from said frame;
 (d) first and second retaining members acting between said main member and said third member, said first retaining member acting to retain said third member in said operating condition and said second retaining member being adapted to retain said third member in said transport condition when said hitch is rotated through substantially 90°.

Yet a further problem occurring in pull-type swathers is the distance between the tractor hitch and the cutter bar of the swather. As the swather travels over smooth terrain, the cutter bar generally follows the ground profile closely. As the terrain becomes less smooth and even, the ground profile may be significantly departed from by the cutter bar due to the length between the rearward wheels of the tractor and the cutter bar of the swather. Further, there are the problems earlier stated which are involved in mounting a removable third wheel to support the forward portion of the swather while being transported.

According to yet a further aspect of the invention, there is disclosed an implement adapted for connection to a pulling vehicle, said implement having at least two wheels mounted to the implement frame and located rearwardly of the longitudinal axis of the implement, one of said wheels being mounted adjacent one end of said implement and the other of said wheels being mounted adjacent the opposite end of said implement, a hitch means connected at one end to said implement and at the other end being adapted for connection to a pulling vehicle, said one end of said hitch being articulately connected to said implement for limited rotational movement about a vertical axis and a second axis transverse to said vertical axis, an extension of said implement frame with a wheel mounted for free castoring movement connected thereto, said wheel being mounted between said articulate connection and the end of said hitch means adapted for connection to said implement whereby the weight of said swather without said hitch means is distributed substantially among said wheels.

In the accompanying drawings, which illustrate embodiments of the invention;

Figure 1:
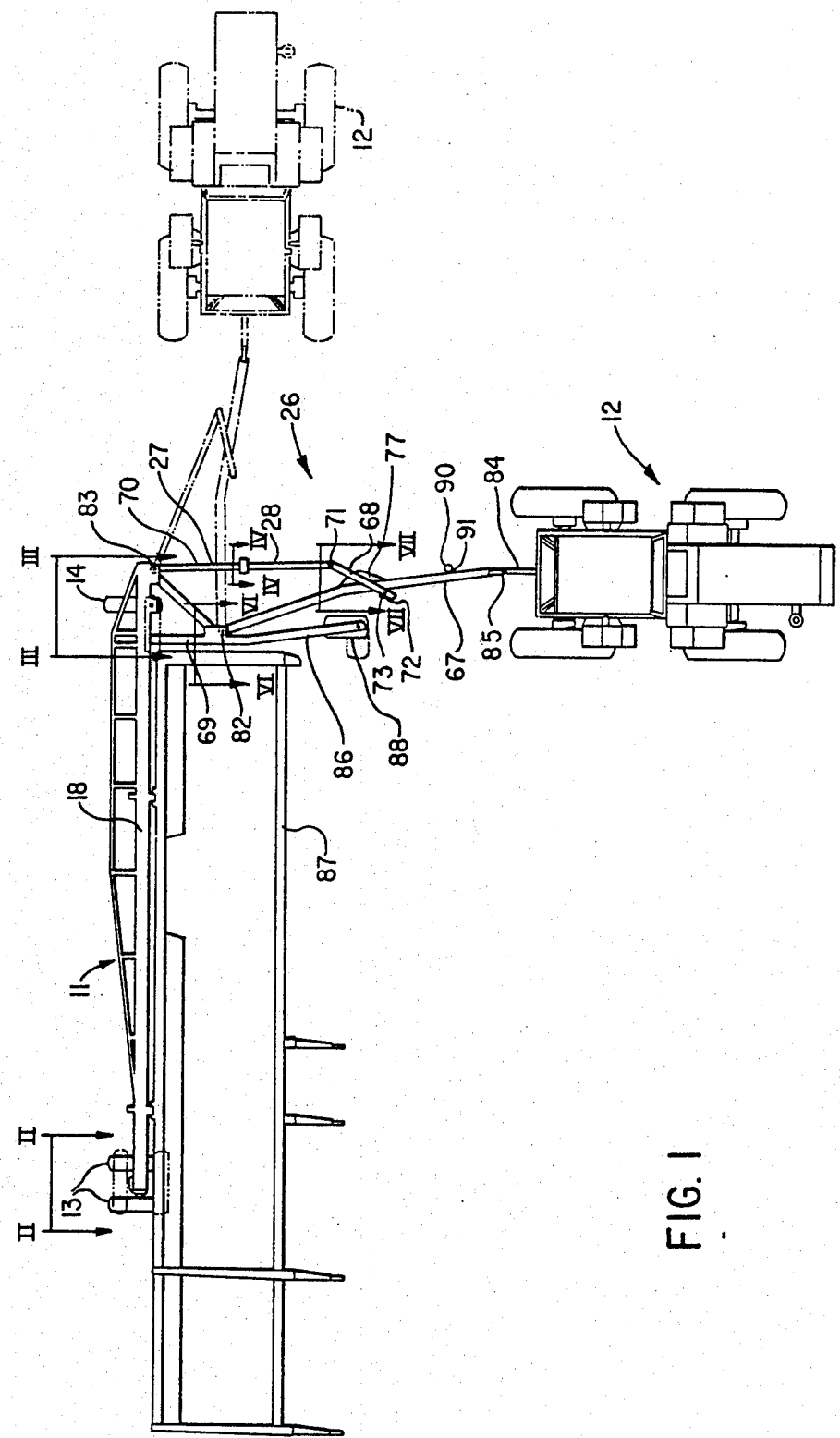
FIG. 1 is a plan view of the swather frame and its pulling tractor in its operating mode and showing its transport mode in phantom lines.

Referring now to FIG. 1, a swather is shown generally at 11 being pulled by tractor 12. Not shown are the reel, the table feed, the cutter bar and the various mechanical means of the swather which operate to power these mechanisms. These elements are well known in the art and form no part of the present invention.

Located rearwardly of the swather 11 are fixed outer drive wheels 13 and fixed inner wheel 14. The directions "forwardly", "rearwardly", "left" and "right" are used throughout this specification, except where noted otherwise, in the normal sense as an operator would use them with reference to the tractor and swather in its operating mode as depicted in FIG. 1.

Figure 2:
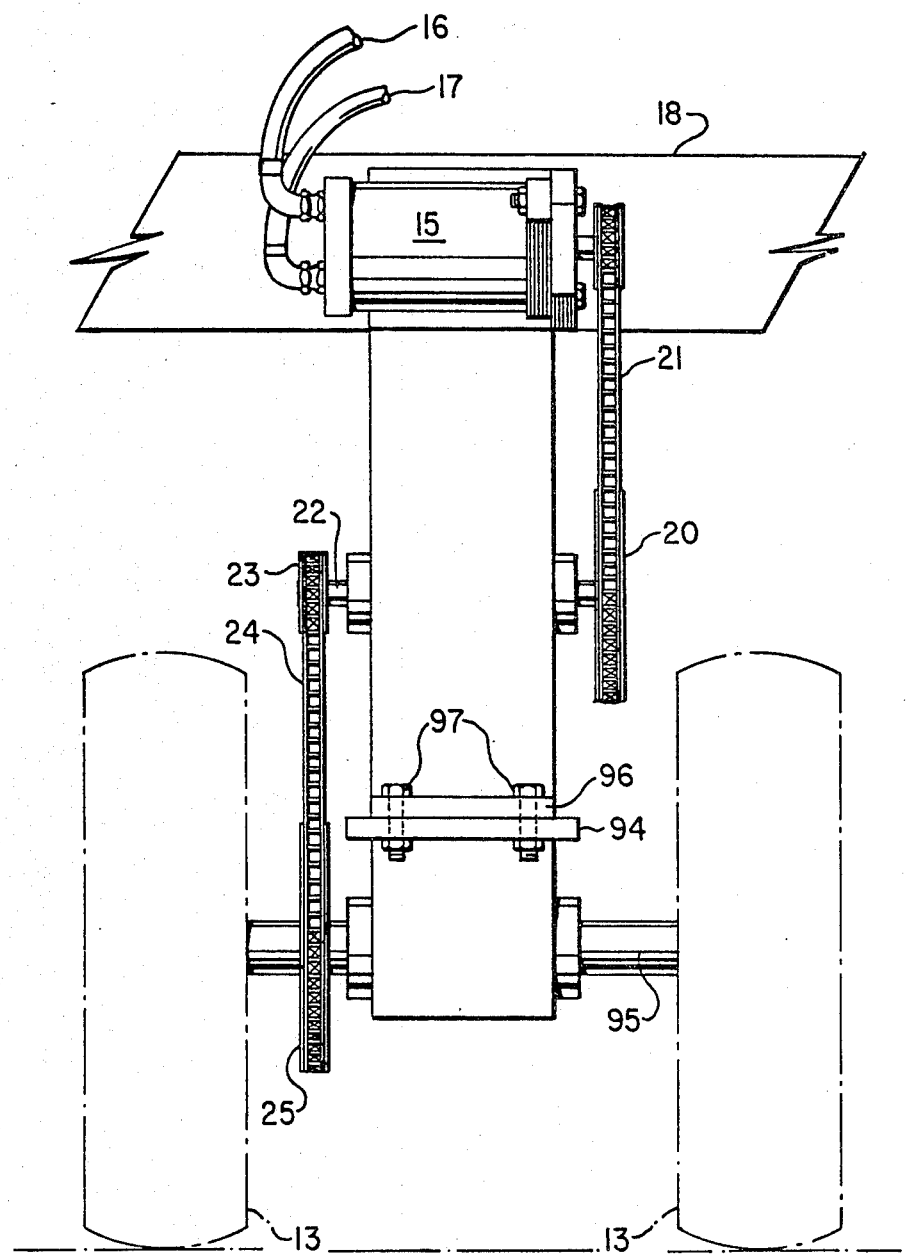
FIG. 2 is a front view of the drive wheels and hydraulic motor of the swather of FIG. 1 taken along line 2—2 in FIG. 1.
Figure 3:
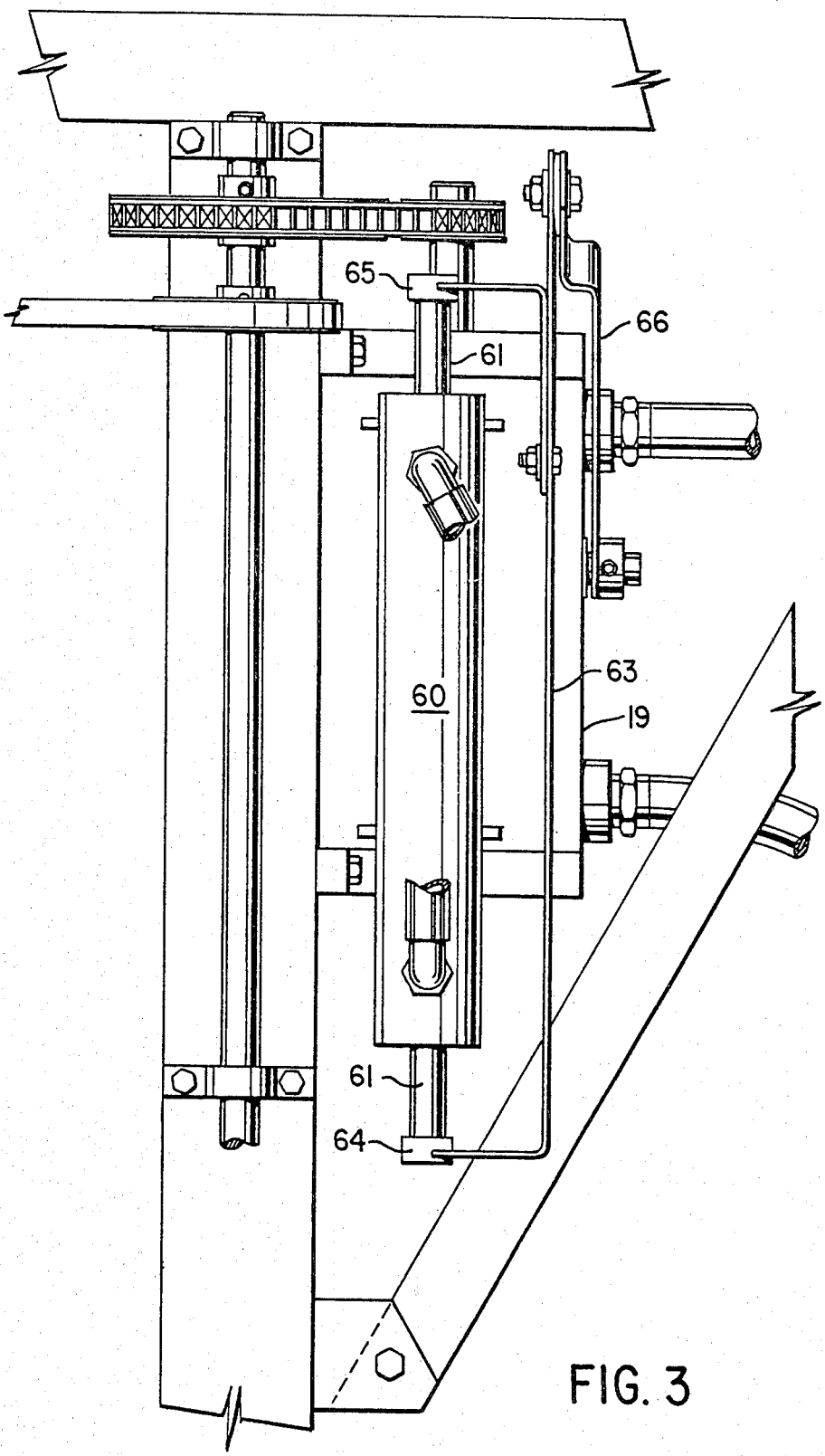
FIG. 3 is a partial enlarged plan view of the area denoted by line 3—3 in FIG. 1 and depicting the placement and configuration of the double acting cylinder and hydraulic pump of the hydraulic system.

A hydraulic motor 15 (FIG. 2), when activated, drives the drive wheels 13 through chain drive 21, gear sprocket 20, axle 22, gear sprocket 23, chain drive 24 and gear sprocket 25. The axle 95 of drive wheels 13 is mounted on plate 94 which is secured to a similar plate 96 thereabove by bolted connection 97. The two plates 94 and 96 can rotate relative to each other and, accordingly, the drive wheels are adapted to move through an angle of 90°. Fixed inner wheel 14 is mounted to sub-frame 18 as is known in the art but provision is also made for the wheel to be rotated 90°. This is accomplished by inserting a removable pin through the vertical axis of the wheel which is inserted into a cylinder mounted on sub-frame 18. High pressure hydraulic lines 16 and 17 run from the hydraulic motor 15 through the swather sub-frame 18 to the hydraulic pump 19 (FIGS. 3 and 5).

A compression connection 25 (FIG. 4) is incorporated in the hitch 26 of the swather 11 between telescoping hitch members 27 and 28, hitch member 28 telescoping within hitch member 27. A forward bracket 29 is rigidly formed on hitch member 27 and a rearward bracket 30 is rigidly formed on hitch member 28. Two rubber compression members 31 and 32 are mounted between brackets 29 and 30 and two further rubber compression members 33 and 34 are mounted forwardly of bracket 29. Metal cylindrical members 37,38,39 and 40 surround the compression members and bolts 35 and 36 extend axially through the compression members 31,32,33 and 34 and brackets 29 and 30 and are secured by nuts 41 and 42 located on the opposite side of metal flat washers 43 and 44. The compression connection 25 is adjusted so as to allow limited longitudinal movement of approximately 3/64" between the telescoping hitch members 27 and 28. Pin 45 is rigidly mounted on hitch member 27 and pin 46 is rigidly mounted on extension 101 which rotates about pin 102, pin 102 being rigidly attached to hitch member 28. Thus, the pins 45 and 46 are offset from the longitudinal axis of the hitch members 27 and 28 and located on opposite sides thereof. Identical links 47 and 48 are positioned on the top and bottom of the pins 45 and 46 and are secured, together with pin 102 on hitch member 26, with flat washers 49,50 and 103 on the top and similar flat washers (not shown) on the bottom together with cotter pins 51,52 and 104 and identical cotter pins (not shown) on the bottom.

Figure 4:
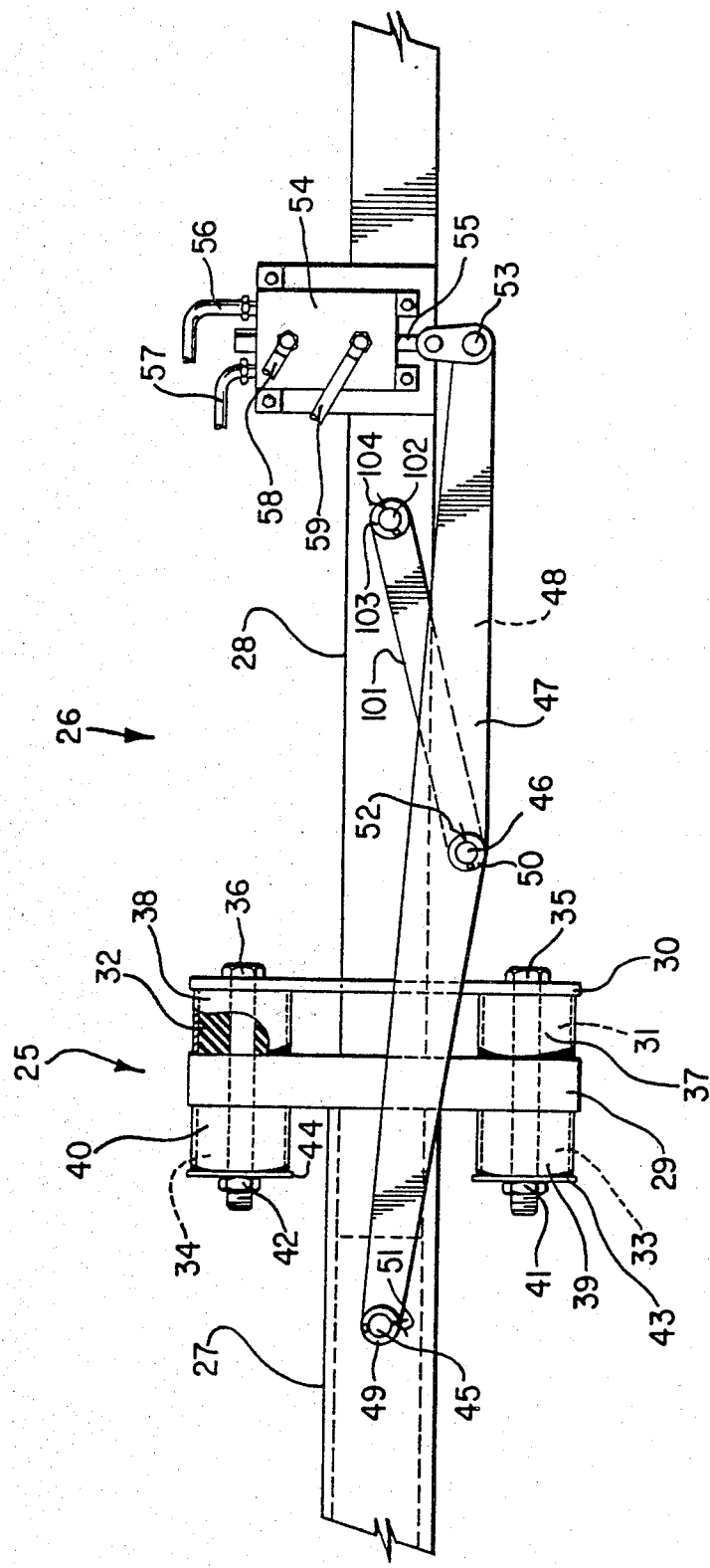
FIG. 4 is a partial enlarged plan view of the area denoted by line 4—4 in FIG. 1 and depicts the compression connection and directional control valve used in the hydraulic system of the swather of FIG. 1.

As is clearly seen in FIG. 4, links 47 and 48 extend rearwardly beyond pin 46 and are attached through a further pin connection 53 to the spool 55 of four-way, three-position directional control valve 54. Valve 54 is designed to adopt one of three positions as best seen in FIG. 5, depending upon the position of spool 55. A pressure line 56 extends from the hydraulic pump 19 to the directional control valve 54 and a tank line 57 extends from the hydraulic tank also to the directional control valve 54. Pressure lines 58 and 59 extend from directional control valve 54 to double acting cylinder 60.

Figure 5:
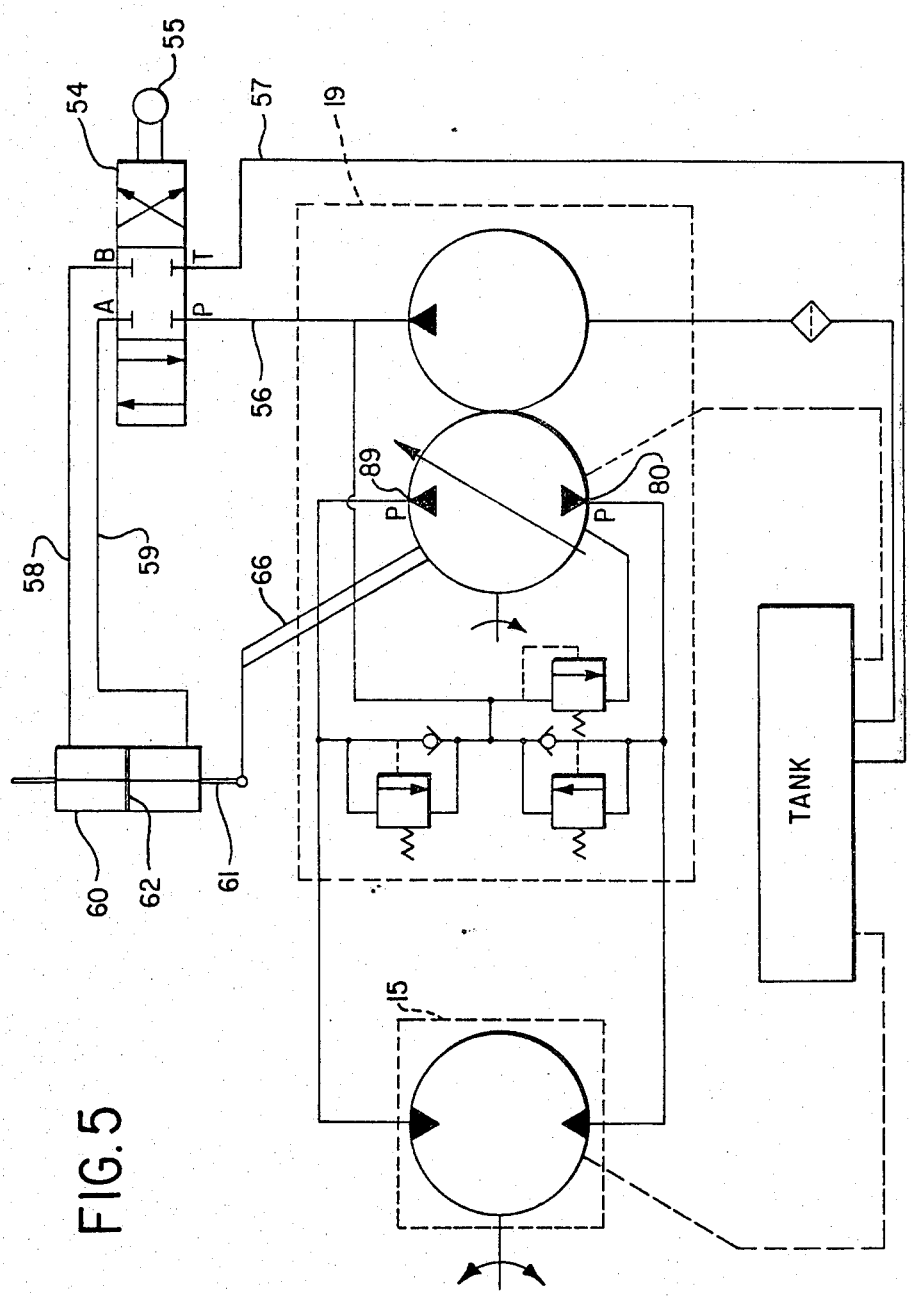
FIG. 5 is a schematic diagram of the hydraulic circuit used in the swather of FIG. 1.

Referring again to FIG. 3 as well as FIG. 5, double acting cylinder 60 has a single shaft 61 extending from the ends of the cylinder 60. A piston 62 (FIG. 5) surrounds the shaft 61 within the cylinder 60.

An adjustable U-shaped bracket 63 (FIG. 3) is mounted on the ends of the shaft 61 with collars 64 and 65 securing the bracket between a shoulder on the shaft 61 and the end of the shaft. A pintle arm 66 is connected to the bracket 63 and extends to the side of the hydraulic pump 19 where it is connected via ordinary means to the swash plate (not shown) within pump 19.

Figure 6:
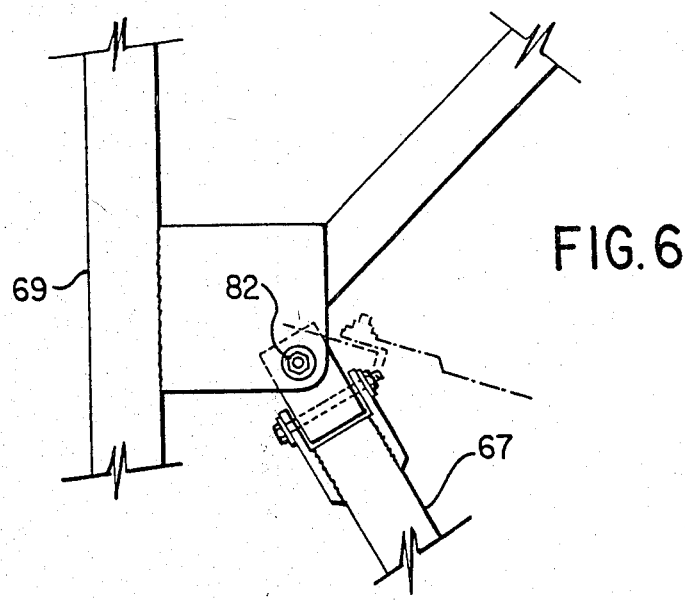
FIG. 6 is a partial enlarged view of the area shown by line 6—6 of FIG. 1 and depicts the articulated connection between the main hitch member and the frame of the swather.

Referring again to FIG. 1, the swather hitch is shown generally at 26 and comprises main hitch member 67, secondary hitch member shown generally at 70 which is composed of telescoping members 27 and 28 and rotate link 68. Main hitch member 67 is articulately connected to swather frame 69 at 82 as best seen in FIG. 6. An articulated connection identical to that shown in FIG. 6 is also used for the connection at 83 between secondary hitch member 70 and the swather frame 69.

Figure 7:
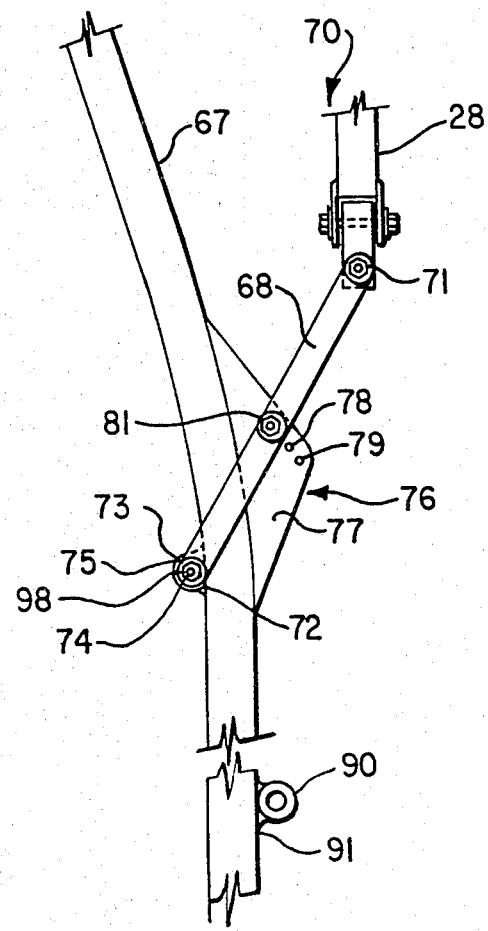
FIG. 7 is a partial enlarged plan view of the rotate link and hitch members at the area shown by line 7—7 of the swather of FIG. 1.
Figure 8:
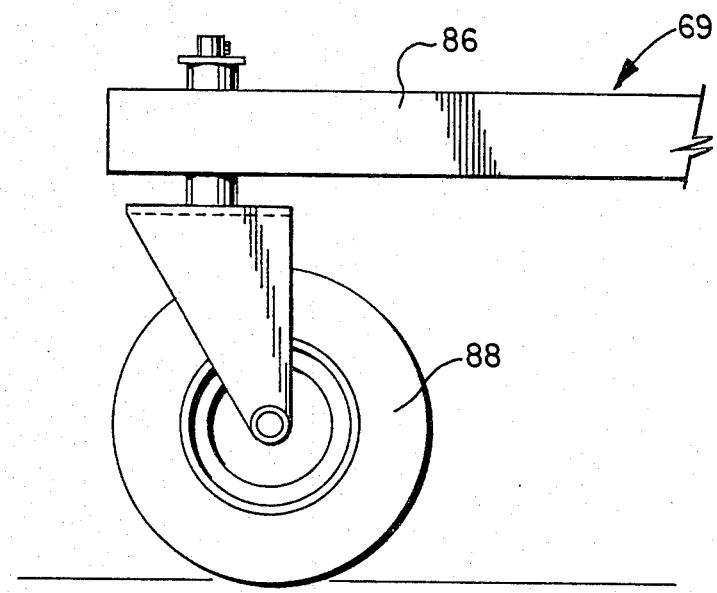
FIG. 8 is a partial view taken from the right side of FIG. 1 showing the castoring third wheel mounted on the swather frame extension.

Rotate link 68 is articulately connected at 71 to secondary hitch member 70 and extends to main hitch member 67 at 72. As seen in FIG. 7, a cylinder 73 is mounted in main hitch member 67 and rotate link 68 is connected to cylinder 73 using a bolt 74, flat washer 75 and lock nut 98. A second cylinder 90 identical to cylinder 73 is mounted on main hitch member 67 at 91 (FIG. 1). Its purpose will be described hereafter.

A bracket 76 is rigidly connected by welding to main hitch member 67 and extends leftwardly therefrom. It has a top plate 77 and a bottom plate (not shown) welded thereto and three identical diameter holes, only two 78 and 79 of which can be seen, are drilled through the plates. Cylinders (not shown) extend between each respective pair of holes drilled in the plates so as to provide protection and support for bolt 81 to pass therethrough. A matching hole in rotate link 68 is positioned over and under one of the appropriate holes depending on the swather operating position desired. Bolt 81 extends therethrough and secures the rotate link 68 against rotation. Main hitch member 67 is connected at 85 to tractor hitch 84 in the usual way.

An extension 86 of the swather frame 69 extends forwardly of the swather 11 and terminates between the cutter bar 87 and the tractor 12. A freely castoring third wheel 88 is mounted on the frame extension 86 in a manner known in the art.

In operation, it will be assumed the longitudinal axis of the swather 11 is initially perpendicular to the axis of the tractor 12 while the tractor 12 and swather 11 are underway. In such case, the compression connection 25 (FIG. 4) will be in its neutral position and, accordingly, link 47 will not move sufficiently to change the position of the spool 55 of directional control valve 54 which will, therefore, be in the position shown in FIG. 5. In such a position, the pintle arm 66 will be such that hydraulic pump 19 is pumping an amount of fluid to hydraulic motor 15 sufficient to keep the swather 11 perpendicular to the tractor path at a constant speed.

If the swather 11 subsequently is pulled uphill or encounters loose soil conditions, the end of the swather 11 furthest removed from the tractor 12 will begin to lag behind its original transverse position. In this event, and when the lag reaches a predetermined amount, the drag on the tractor will increase and compression connection 25 will begin to separate. This longitudinal separation in compression connection 25 caused by the relative axial movement between telescoping hitch members 27 and 28 will be translated through link 47 to rotational movement of the end of link 47 at pin connection 53. This, in turn, will move the spool 55 of directional control valve 54 inwardly towards the directional control valve 54 and the valve will assume its leftmost position with reference to FIG. 5.

In such position, fluid will pass through directional control valve 54 to the portion of double acting cylinder 60 above piston 62. Piston 62 and, accordingly, shaft 61 will be moved downwardly. With reference also to FIG. 3, this motion will be transmitted through U-shaped bracket 63 to pintle arm 66 which is connected to hydraulic pump 19. The displacement of the pintle arm 66 will be transmitted to the swash plate (not shown) of the hydraulic pump 19 and an increase in fluid volume will pass to hydraulic motor 15 and, accordingly, the rotation of the drive wheels 13 will increase until the swather 11 reaches its desired position transverse to the axis of the tractor 12. When that position is reached, the compression connection 25 will move together, thus moving the link 47 and spool 55 of directional control valve 54 outwardly. The valve 54 will assume the position shown in FIG. 5, the piston 62 of the double acting cylinder 60 will remain in its new position and fluid will continue to flow at the new rate to the hydraulic motor 15 and drive wheels 13. If this new rate of fluid flow drives the drive wheels 13 such that the end of swather 11 begins to lead its original desired transverse position, the telescoping hitch members 27 and 28 and, accordingly, compression connection 25 will move together even a greater amount. The end of link 47 at pin connection 53 will move outwardly together with spool 55 of directional control valve 54 and, accordingly, valve 54 will assume a position in its rightmost position with reference to FIG. 5. In this position, fluid will be directed through valve 54 to the double acting cylinder 60 below the piston 62 and, accordingly, piston 62 and shaft 61 will move upwardly thus decreasing the flow of fluid from hydraulic pump 19 to hydraulic motor 15. The drive wheels 13, therefore, decrease in speed of rotation.

Clearly, assuming operating conditions remain the same, an equilibrium position will be achieved where the speed of the drive wheels is such that the swather will remain in its desired condition transverse to the axis of the tractor while in operation.

Under certain operating conditions, such as where the tractor 12 is making a very tight turn in the direction of the swather 11 and the centre of the turning circle of the tractor 12 falls inside the drive wheels 13, the drive wheels should rotate in a reverse direction. Thus, the hydraulic pump 19 has the capability to pump fluid from a second port as opposed to the first (i.e., port 80 rather than 89 in FIG. 5) and the hydraulic motor 15 utilized is such that rotation in both directions is possible.

The hitch 26 of the swather 11 will be attached to tractor hitch 84 (FIG. 1) as is normal and the rotate link 68 will be positioned over one of the holes in the plate 77 in bracket 76 (FIG. 7) with bolt 81 securing the rotate link 68 in that position. The series of holes in the bracket 76, only two 78 and 79 of which are showing in FIG. 7, give the operator the capability to choose the lateral distance the swather 11 may extend outwardly from the tractor 12 such that the swath is made outwardly of the wheels of the tractor.

When it is desired to change the swather from its operating to its transport mode, the operator merely removes bolt 81 from rotate link 68 and drives forward. The rotate link 68 will rotate about the axis of cylinder 73 until the rotate link 68 takes the position shown in phantom lines in FIG. 1. In this position, the hole in the rotate link 68 through which bolt 81 was inserted in the swather's operating position, will be aligned with cylinder 90 at 91 and bolt 81 is re-inserted through the hole in rotate link 68 and secured. The chain drive 24 is removed from gear sprocket 23 and lower plate 94 is rotated 90° by removal of bolted conenction 97 from the plates. The drive wheels 13 will then take the position shown in phantom lines in FIG. 1. The pin (not shown) extending through the cylinder and axis of fixed inner wheel 14 is removed and the wheel 14 then becomes a freely castoring wheel. The swather 11 is thus now ready for transporting.

Figure 9:
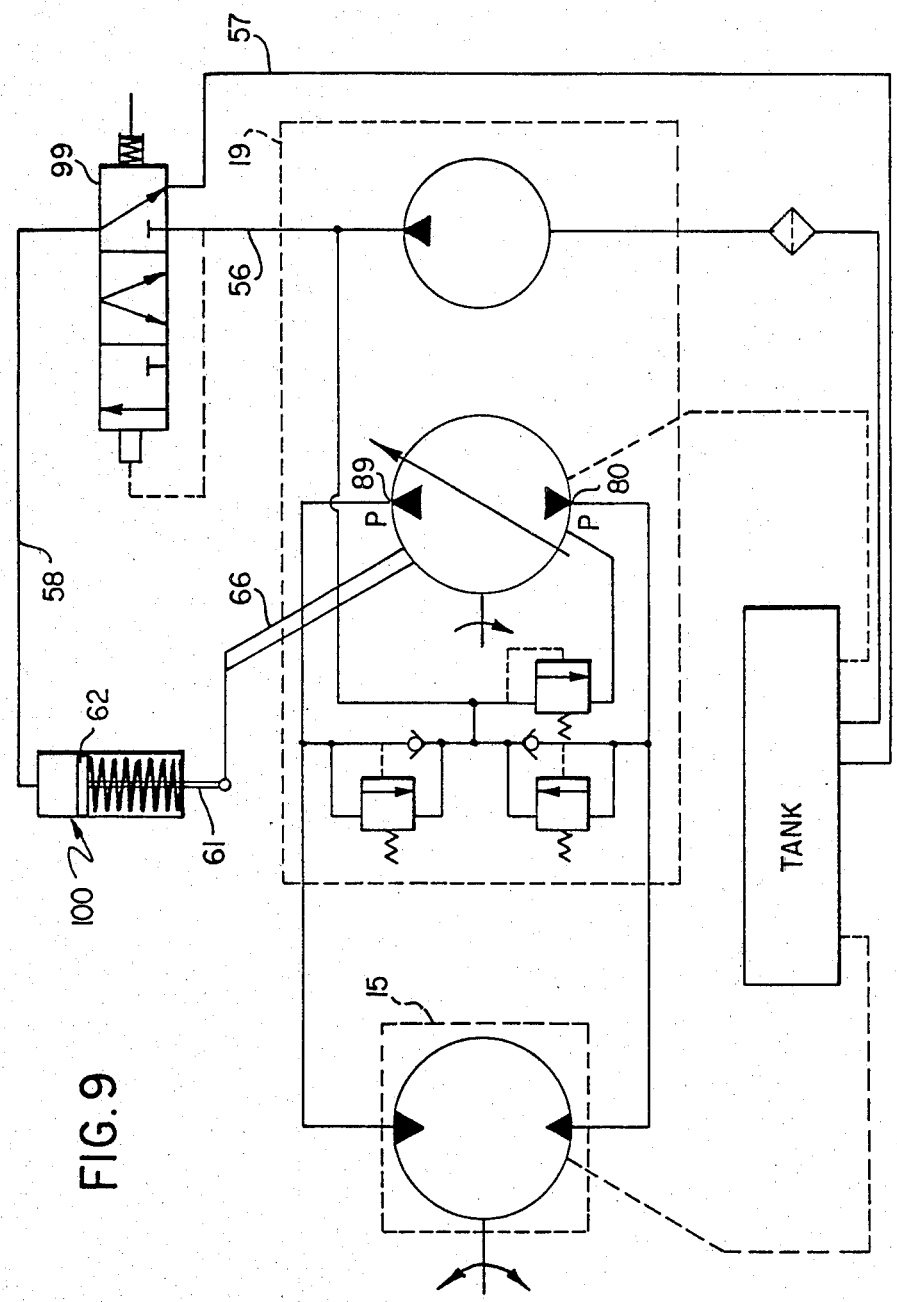
FIG. 9 is a schematic diagram of a hydraulic circuit alternative to that of FIG. 5.

In one alternative embodiment, it may be preferred to replace the three position directional control valve 54 with a pressure compensator 99 and to replace the double acting cylinder 60 with a single acting cylinder with a spring return. This configuration is depicted in FIG. 9 with all other details and reference numbers being identical to those shown in FIG. 5.

Figure 10:
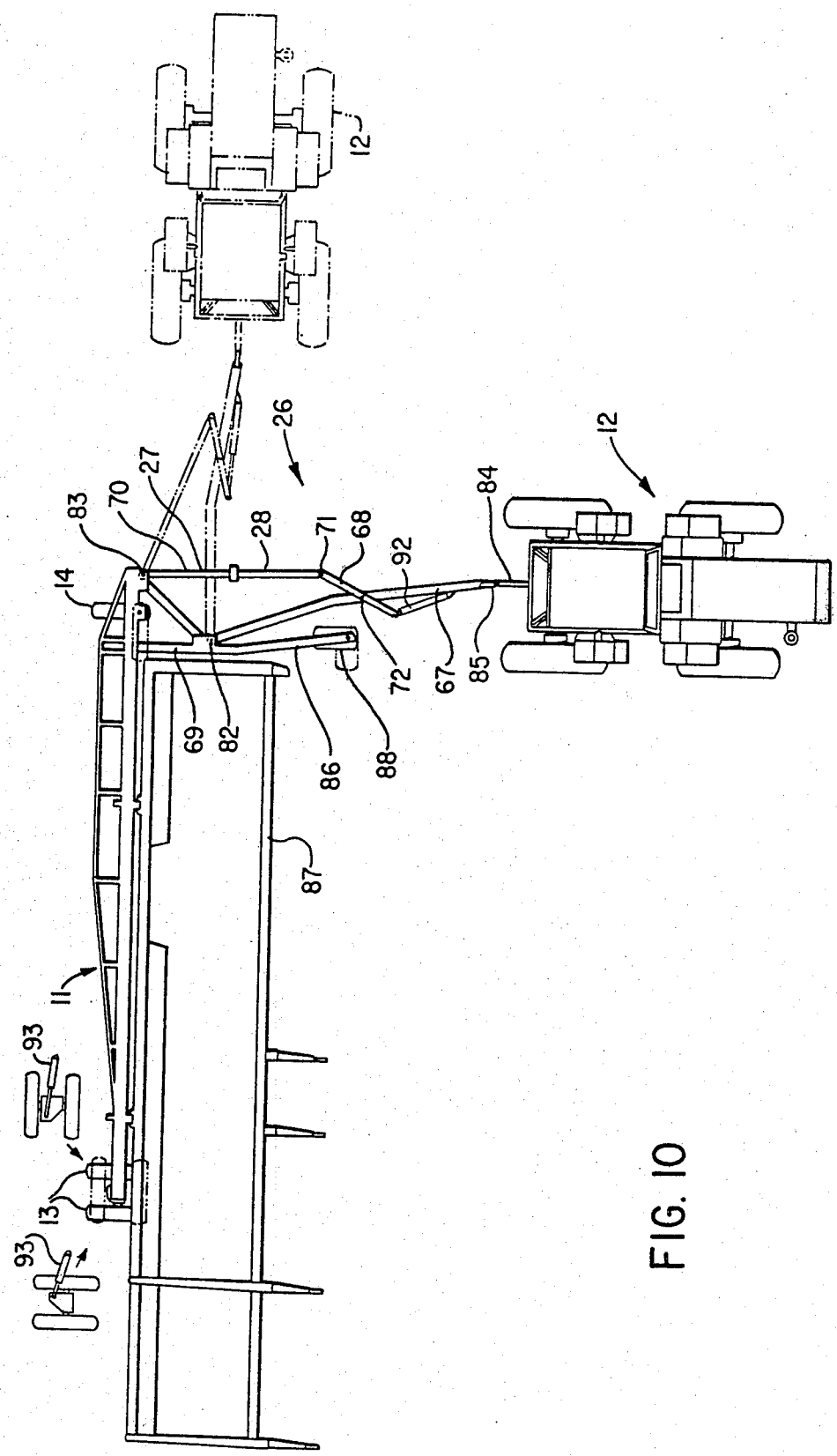
FIG. 10 is a view depicting an alternative embodiment of the swather of FIG. 1.

Similarly, in a second alternative embodiment, it may be desired to provide a hydraulic cylinder 92 between the end of rotate link 68 which will, accordingly, extend beyond connection 72 between main hitch member 67 and rotate link 68 as seen in FIG. 10. This would allow the operator to rotate the swather through 90° to its transport position without the necessity of moving the tractor. In this embodiment or in yet a further embodiment, the drive wheels 13 could be rotated through 90° by using a second hydraulic cylinder 93 mounted between swather sub-frame 18 and an offset on the lower plate 94. This would avoid the necessity of manually rotating the drive wheels 13.

An embodiment of the invention has accordingly been described which has proved useful and effective at the present time. Changes in the practical configuration additional to those mentioned may well be made without departing from the invention which should, therefore, only be limited by the scope of the accompanying claims.

The embodiments of the invention in which an exclusive property or privilege is claimed are defined as follows:

1. A position compensating system to alter the sidedraft of a pull-type implement pulled by a source of pull power, said system comprising:
   (a) a drive wheel for supporting the frame of said implement and adapted to drive said implement;
   (b) drive means connected to said drive wheel to drive said drive wheel;
   (c) at least two hitch members forming a part of a connection between said source of pull power and said implement, one of said hitch members being movable relative to the other of said hitch members;
   (d) a sensing mechanism mounted between said hitch members for sensing said relative movement of said hitch members; and
   (e) a compensating means to which said sensing means is connected and connected to said drive means and operable in response to said sensing mechanism for automatically varying the output of said drive means.

2. A position compensating system as claimed in claim 1 wherein said hitch members are relatively axially movable, and said sensing mechanism comprises a connection between said hitch members limiting the amount of said relative axial movement, a lever pivotally mounted on one of said hitch members and rotatable about said pivotal mounting upon relative axial movement between said hitch members.

3. A position compensating system as claimed in claim 1 wherein said drive means is a hydraulic motor and said compensating means comprises means for varying the flow of fluid to said hydraulic motor.

4. A position compensating system as in claim 3 in which said drive means further includes a hydraulic pump acting to supply fluid to said motor, and said compensating means comprises means for varying the supply of fluid from said pump to said motor.

5. A position compensating system as in claim 4, wherein said compensating means comprises a hydraulic actuation valve and a hydraulic cylinder to which said valve is connected, said cylinder being mechanically connected to said hydraulic pump.

6. A position compensating system as in claim 5 wherein said lever is connected to the spool of said hydraulic actuation valve.

7. A position compensating system as in claim 5 wherein said hydraulic actuation valve is a four-way, three-position valve and said hydraulic cylinder is double-acting.

8. A position compensating system as in claim 4 wherein said compensating means comprises a pressure compensator and a hydraulic cylinder to which said pressure compensator is connected, said cylinder being mechanically connected to said pump.

9. A position compensating system as in claim 8 wherein said hitch members are relatively axially movable, and said hitch members have a connection therebetween for limiting the amount of said relative axial movement, and said sensing mechanism comprises a lever pivotally mounted on one of said hitch members and adapted to rotate about said pivotal connection upon said relative axial movement.

10. A position compensating system as in claim 2 or 9 wherein said implement is a swather.

11. A position compensating system as in claim 10 wherein said hydraulic cylinder is single-acting and spring returnable.

* * * * *